(12) United States Patent
Lee et al.

(10) Patent No.: US 12,368,330 B2
(45) Date of Patent: Jul. 22, 2025

(54) BATTERY MANAGEMENT SYSTEM AND BATTERY RACK FOR WIRELESS CHARGING

(71) Applicant: LG ENERGY SOLUTION, LTD., Seoul (KR)

(72) Inventors: Jung Hoon Lee, Daejeon (KR); Moon Koo Chung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 396 days.

(21) Appl. No.: 17/794,336

(22) PCT Filed: Jun. 15, 2021

(86) PCT No.: PCT/KR2021/007445
§ 371 (c)(1),
(2) Date: Jul. 21, 2022

(87) PCT Pub. No.: WO2021/256817
PCT Pub. Date: Dec. 23, 2021

(65) Prior Publication Data
US 2023/0050428 A1    Feb. 16, 2023

(30) Foreign Application Priority Data
Jun. 15, 2020 (KR) .................. 10-2020-0072623

(51) Int. Cl.
*H02J 7/00* (2006.01)
*H01M 10/42* (2006.01)
(Continued)

(52) U.S. Cl.
CPC ......... *H02J 50/80* (2016.02); *H01M 10/4207* (2013.01); *H01M 10/4257* (2013.01);
(Continued)

(58) Field of Classification Search
CPC ........... H01M 50/289; H01M 10/4207; H01M 10/4257; H01M 2010/4271;
(Continued)

(56) References Cited

U.S. PATENT DOCUMENTS 9,118,198 B2    8/2015    Naskali et al.
9,590,444 B2    3/2017    Walley et al.
(Continued)

FOREIGN PATENT DOCUMENTS

CN    110050378 A    7/2019
EP    3451436 A1    3/2019
(Continued)

OTHER PUBLICATIONS

Yang et al., "Wireless Power Transfer Techniques for Cell Balancing of Battery Management Systems," 2014 IEEE Wireless Power Transfer Conference, IEEE, (May 8, 2014), pp. 162-165, XP032608778, DOI: 10.1109/WPT.2014.6839591 [retrieved on Jun. 18, 2014]* p. 163-p. 164*.
(Continued)

*Primary Examiner* — Zixuan Zhou
(74) *Attorney, Agent, or Firm* — Morgan, Lewis & Bockius LLP

(57) ABSTRACT

A disclosed battery management system for wireless charging includes a communication circuit and a controller. The communication circuit receives information on a first state of charge (SOC) of the first battery module, a second SOC of the second battery module, and a third SOC of the third battery module. The controller controls the first wireless charging between the first battery module and the second battery module and the second wireless charging between the second battery module and the third battery module for balancing between the first SOC, the second SOC, and the third SOC. The first wireless charging is to wirelessly (Continued)

transmit power from one of the first battery module and the second battery module to the other battery module. The second wireless charging is to wirelessly transmit power from one of the second battery module and the third battery module to the other battery module.

10 Claims, 11 Drawing Sheets

(51) Int. Cl.
*H01M 50/289* (2021.01)
*H02J 7/34* (2006.01)
*H02J 50/10* (2016.01)
*H02J 50/23* (2016.01)
*H02J 50/80* (2016.01)

(52) U.S. Cl.
CPC ....... *H01M 50/289* (2021.01); *H02J 7/00036* (2020.01); *H02J 7/0014* (2013.01); *H02J 7/0048* (2020.01); *H02J 7/342* (2020.01); *H02J 50/10* (2016.02); *H02J 50/23* (2016.02); *H01M 2010/4271* (2013.01); *H01M 2010/4278* (2013.01)

(58) Field of Classification Search
CPC .. H01M 2010/4278; H02J 50/10; H02J 50/23; H02J 50/80; H02J 7/00036; H02J 7/0014; H02J 7/0048; H02J 7/342
USPC .......................................... 320/108; 307/104
See application file for complete search history.

(56) References Cited

U.S. PATENT DOCUMENTS

| | | | |
|---|---|---|---|
| 9,716,401 | B2 | 7/2017 | Wojcik |
| 2014/0055079 | A1 | 2/2014 | Lee |
| 2014/0055096 | A1 | 2/2014 | Lee |
| 2014/0091623 | A1 | 4/2014 | Shippy et al. |
| 2015/0137749 | A1 | 5/2015 | Park |
| 2017/0338688 | A1 | 11/2017 | Park |
| 2019/0067755 | A1* | 2/2019 | Kim ........................ B60L 58/16 |
| 2019/0123404 | A1 | 4/2019 | Kim et al. |
| 2019/0265304 | A1 | 8/2019 | Kim et al. |
| 2019/0393712 | A1 | 12/2019 | Kim et al. |
| 2020/0036196 | A1 | 1/2020 | Fasano et al. |

FOREIGN PATENT DOCUMENTS

| | | |
|---|---|---|
| JP | 2013-059172 A | 3/2013 |
| JP | 6242897 B2 | 12/2017 |
| JP | 2019-041566 A | 3/2019 |
| JP | 2020-022345 A | 2/2020 |
| JP | 2020-089055 A | 6/2020 |
| KR | 10-2012-0016993 A | 2/2012 |
| KR | 10-2013-0123842 A | 11/2013 |
| KR | 10-2014-0026152 A | 3/2014 |
| KR | 10-1457191 B1 | 10/2014 |
| KR | 10-1508664 B1 | 4/2015 |
| KR | 10-2015-0057783 A | 5/2015 |
| KR | 10-2016-0129617 A | 11/2016 |
| KR | 10-2018-0101822 A | 9/2018 |
| KR | 10-2019-0010032 A | 1/2019 |
| KR | 10-2019-0023295 A | 3/2019 |
| KR | 10-2019-0045708 A | 5/2019 |

OTHER PUBLICATIONS

Extended European Search report dated Jun. 19, 2023, issued in corresponding European Patent Application No. 21826854.8.
Office Action dated Jul. 31, 2023, issued in corresponding Japanese Patent Application No. 2022-542029.
Ji-Hun Lim et al., "Battery Charging System using Magnetic Induction," Journal of the Korea Institute of Information and Communication Engineering, vol. 17, No. 10, pp. 2239-2244, Oct. 31, 2013 (with partial translation) translation) and Written Opinion dated Sep. 30, 2021, for corresponding PCT/KR2021/007445.
International Search Report (with partial translation) and Written Opinion dated Sep. 30, 2021, for corresponding International Patent Application No. PCT/KR2021/007445.
Office Action issued on Mar. 4, 2025 in Chinese Patent Application No. 202180010271.3. (Note—EP 3451436 A1, the 2013 paper by Ji-Hun Lim et al., and the 2014 paper by Heecheol Yang et al. cited in this CN Office Action were cited in prior IDSs.).
Office Action issued on Feb. 25, 2025 in Korean Patent Application No. 10-2020-0072623. (Note—KR 10-2019-0023295 A cited in this KR Office Action was cited in a prior IDS.).

* cited by examiner $k_0 = 0.7$
$A = 70\%$
$B = 90\%$
$C = 80\%$
$D = 60\%$
$E0 = 10^4 [Wh]$ WIRELESS CHARGING EFFICIENCIES($e_{12}$, $e_{23}$, $e_{34}$)

$$[e_{12} \ e_{23} \ e_{34}] = 10^4 \times [-20 \ 10 \ 20] \begin{bmatrix} 1.7 & -0.7 & 0 \\ -1 & 1.7 & -0.7 \\ 0 & -1 & 1.7 \end{bmatrix}^{-1} \times \frac{1}{100}$$

$$= 10^4 \times [-20 \ 10 \ 20] \begin{bmatrix} 0.86 & 0.47 & 0.19 \\ 0.67 & 1.14 & 0.47 \\ 0.39 & 0.67 & 0.87 \end{bmatrix} \times \frac{1}{100}$$

BATTERY MANAGEMENT SYSTEM AND BATTERY RACK FOR WIRELESS CHARGING

CROSS-REFERENCE TO RELATED APPLICATIONS

This application claims the benefit of Korean Patent Application No. 10-2020-0072623, filed on Jun. 15, 2020 in the Korean Intellectual Property Office, the disclosure of which is incorporated herein in its entirety by reference.

TECHNICAL FIELD

The present invention relates to a battery management system, and more particularly, to a battery management system for managing wireless charging between battery modules and a battery rack including the same.

BACKGROUND ART

Recently, research and development on secondary batteries has been actively carried out. Here, the secondary battery is a battery capable of charging and discharging, and includes all of a conventional Ni/Cd battery, a Ni/MH battery, and a recent lithium ion battery. Among secondary batteries, lithium ion batteries have an advantage in that their energy density is much higher than that of conventional Ni/Cd batteries and Ni/MH batteries. Lithium-ion batteries may be manufactured to be small and lightweight, and are used as power sources for mobile devices. In particular, a lithium ion battery may be used as a power source for an electric vehicle, and thus attracts attention as a next-generation energy storage medium.

A secondary battery is generally used as a battery module unit in which a plurality of battery cells are connected in series and/or in parallel. Due to a characteristic difference and a temperature difference between cells, a charge imbalance occurs between battery cells included in one battery rack (or battery pack).

Since the charge imbalance deteriorates the performance of the battery rack, a cell balancing technique is used to solve the charge imbalance. Most of the cell balancing techniques currently used are wired. Therefore, as the number of cells increases, the connection between the wire and the switch becomes very complicated, and there is a problem in that the time and cost required for the manufacturing process increase.

DISCLOSURE OF THE INVENTION

Technical Problem

The present invention is to solve the above technical problem, and it is an object of the present invention to provide a battery management system for resolving a charge imbalance between battery modules by controlling wireless charging between battery modules.

Technical Solution

A battery management system according to an embodiment of the present invention may include a communication unit and a controller. The communication unit may receive information on a first state of charge (SOC) of the first battery module, a second SOC of the second battery module, and a third SOC of the third battery module. The controller may control the first wireless charging between the first battery module and the second battery module and the second wireless charging between the second battery module and the third battery module for balancing between the first SOC, the second SOC, and the third SOC. The first wireless charging may be to wirelessly transmit power from one of the first battery module and the second battery module to the other battery module. The second wireless charging may be to wirelessly transmit power from one of the second battery module and the third battery module to the other battery module.

The battery rack according to an embodiment of the present invention may include a plurality of battery modules and a battery management system. The battery management system may control wireless charging between neighboring battery modules such that the sum of absolute differences of SOCs of the neighboring battery modules among the plurality of battery modules decreases and control the first battery module such that power is output from the first battery module among the neighboring battery modules to the second battery module. The SOC of the first battery module may be greater than the SOC of the second battery module. The first battery module may include a first antenna on one surface facing the second battery module, and may transmit power through the first antenna.

Effects of the Invention

The battery rack according to an embodiment of the present invention may charge the battery modules through wireless power transmission between the battery modules. The battery management system according to an embodiment of the present invention may control wireless charging of battery modules to reduce a difference between SOC values of neighboring battery modules based on the SOC values of the battery modules. Accordingly, cell balancing between the battery modules may be performed through wireless charging between the battery modules.

BRIEF DESCRIPTION OF THE DRAWINGS

FIG. 5A is a diagram illustrating charging powers $e_{12}$ to $e_{34}$ calculated by the RMBS 150 of FIG. 1, according to an embodiment.

MODE FOR CARRYING OUT THE INVENTION

Figure 1:
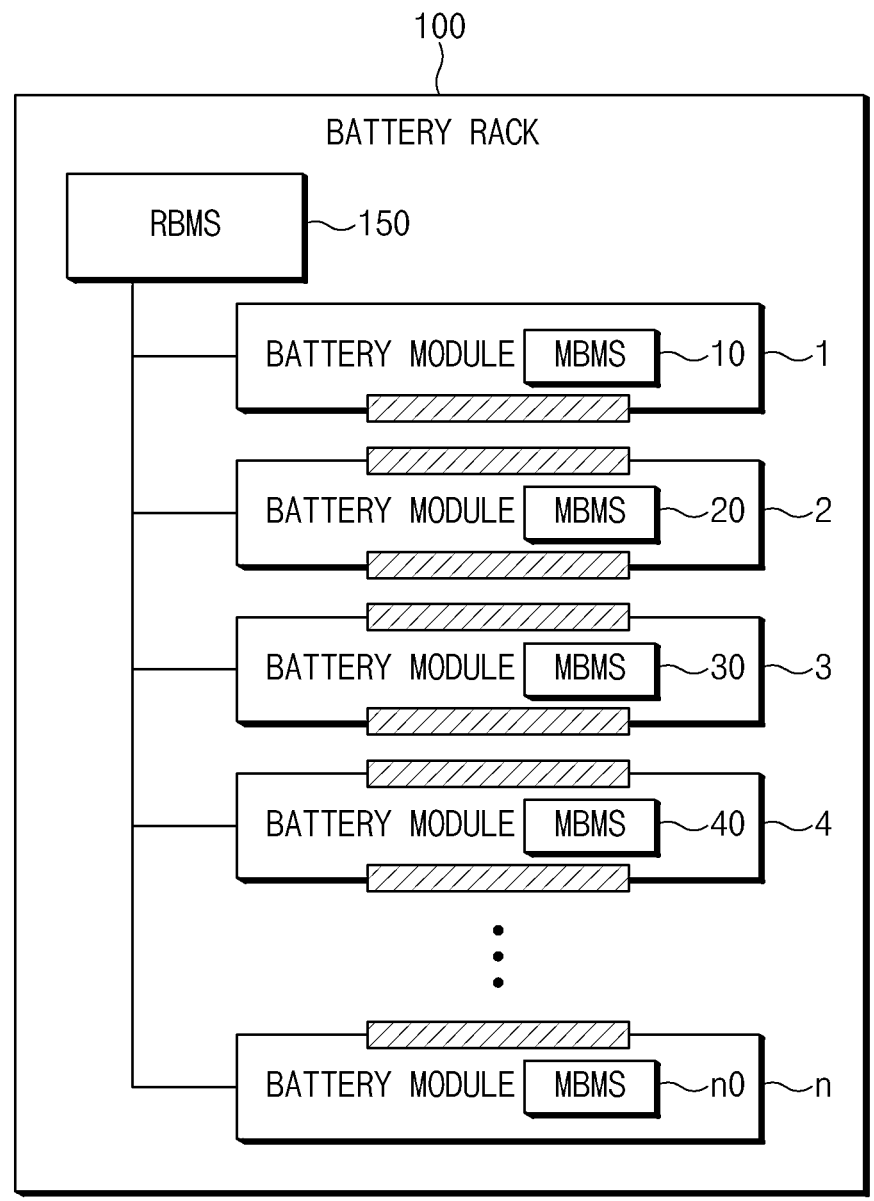
FIG. 1 is a block diagram showing the configuration of a battery rack according to an embodiment of the present invention.

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment, and may not be intended to limit the scope of other embodiments. The terms of a singular form may include plural forms unless otherwise specified.

All terms used herein, including technical or scientific terms, may have the same meaning as commonly understood by a person of ordinary skill in the art. Terms defined in a commonly used dictionary may be interpreted as having the same or similar meaning as the meaning in the context of the related technology, and are not interpreted as ideal or excessively formal meanings unless explicitly defined in this document. In some cases, even terms defined in this document cannot be interpreted to exclude embodiments of the present invention.

FIG. 1 is a block diagram showing the configuration of a battery rack according to an embodiment of the present invention.

A battery rack 100 may include a Rack Battery Management System (RBMS) 150 and battery modules 1 to n. The battery modules 1 to n may each include battery cells connected in series or in parallel (not shown), Module Battery Management Systems (MBMS) 10 to n0 that manage the battery cells, and one or more antennas. The battery rack 100 of the present invention is not limited to the location and number of the components shown in FIG. 1.

In this specification, the battery rack 100 may be understood by a person skilled in the art to be a battery pack. The battery rack 100 is a battery device mainly used in an Energy Storage System (ESS), and the battery pack is a battery device mainly used in a vehicle. The battery pack may provide substantially the same operations as the battery rack 100. The RBMS 150 and the MBMS 10 to n0 may correspond to the master BMS and slave BMSs of the battery pack.

The MBMS 10 to n0 may monitor battery cells included in each of the battery modules 1 to n. For convenience of description, the configuration and operation of the battery module 1 and the MBMS 10 will be intensively described with reference to FIG. 1. The remaining battery modules 2 to n and the remaining MBMS 20 to n0 provide substantially the same operations as the battery module 1 and the MBMS 10.

The battery module 1 may include battery cells connected in series or parallel, the MBMS 10 and an antenna. In FIG. 1, the antenna is represented by a hatched rectangle. The antenna of the battery module 1 may be positioned on one surface facing the neighboring battery module 2 among the battery modules 2 to n arranged in a row. Referring to FIG. 1, the first battery module 1 and the last battery module n among the battery modules 1 to n arranged in a line are illustrated as including one antenna, but the present invention is not limited thereto. The battery modules 1 and n may also include two antennas like the other battery modules.

The MBMS 10 may monitor and manage battery cells of the battery module 1. The MBMS 10 may measure voltages of battery cells. The MBMS 10 may obtain information on State Of Charges (SOCs) of the battery cells based on the voltages of the battery cells. The MBMS 10 may calculate the SOC of the battery module 1 by summing all of the State Of Charges (SOCs) of the battery cells. The MBMS 10 may transmit information on the SOC of the battery module 1 and/or information on the SOC of each of the battery cells to the RBMS 150.

The RBMS 150 may communicate with the MBMS 10 to transmit/receive information. The RBMS 150 may transmit and receive information through the MBMS 10 and Controller Area Network (CAN) communication, or may transmit and receive information through wireless communication such as Zigbee, Wifi, and Bluetooth Low Energy (BLE).

The RBMS 150 may receive information on the SOC of the battery module 1 from the MBMS 10. However, the present invention is not limited thereto, and the RBMS 150 may receive information on the SOC of each of the battery cells of the battery module 1 from the MBMS 10. The RBMS 150 may calculate the SOC of the battery module 1 based on information on the SOC of each of the battery cells of the battery module 1.

As mentioned above, the remaining MBMS 20 to n0 provide substantially the same operations as the MBMS 10. That is, the RBMS 150 may receive information on the SOC of each of the battery modules 1 to n from the MBMS 10 to n0. The RBMS 150 may control wireless charging between the battery modules 1 to n based on information on the SOC of each of the battery modules 1 to n.

The RBMS 150 may determine the direction and magnitude of wireless charging between the battery modules 1 to n so that the sum of the absolute values of the SOC differences between neighboring battery modules among the battery modules 1 to n decreases.

The battery modules 1 to n may perform a wireless charging operation with a neighboring battery module under the control of the RBMS 150. Specifically, the battery module 1 may transmit power to or receive power from the battery module 2 under the control of the RBMS 150. The MBMS 10 may control the battery module 1 so that the battery module 1 transmits power to the battery module 2 or receives power from the battery module 2 based on the information received from the RBMS 150. The battery module 1 may transmit or receive power through an antenna of the battery module 1.

The battery module 2 may transmit power to or receive power from the battery module 1 under the control of the RBMS 150. The battery module 2 may transmit power to or receive power from the battery module 1 through an antenna positioned on one surface facing the battery module 1. However, unlike the battery module 1 that performs a wireless charging operation with one battery module 2, the battery module 2 may perform a wireless charging operation with the battery modules 1 and 3. The battery module 2 may be a battery module positioned between the battery modules 1 and 3. That is, each of the remaining battery modules except for the battery modules 1 and n positioned at the edge may perform a wireless charging operation with the two battery modules located closest to each other.

Figure 2A:
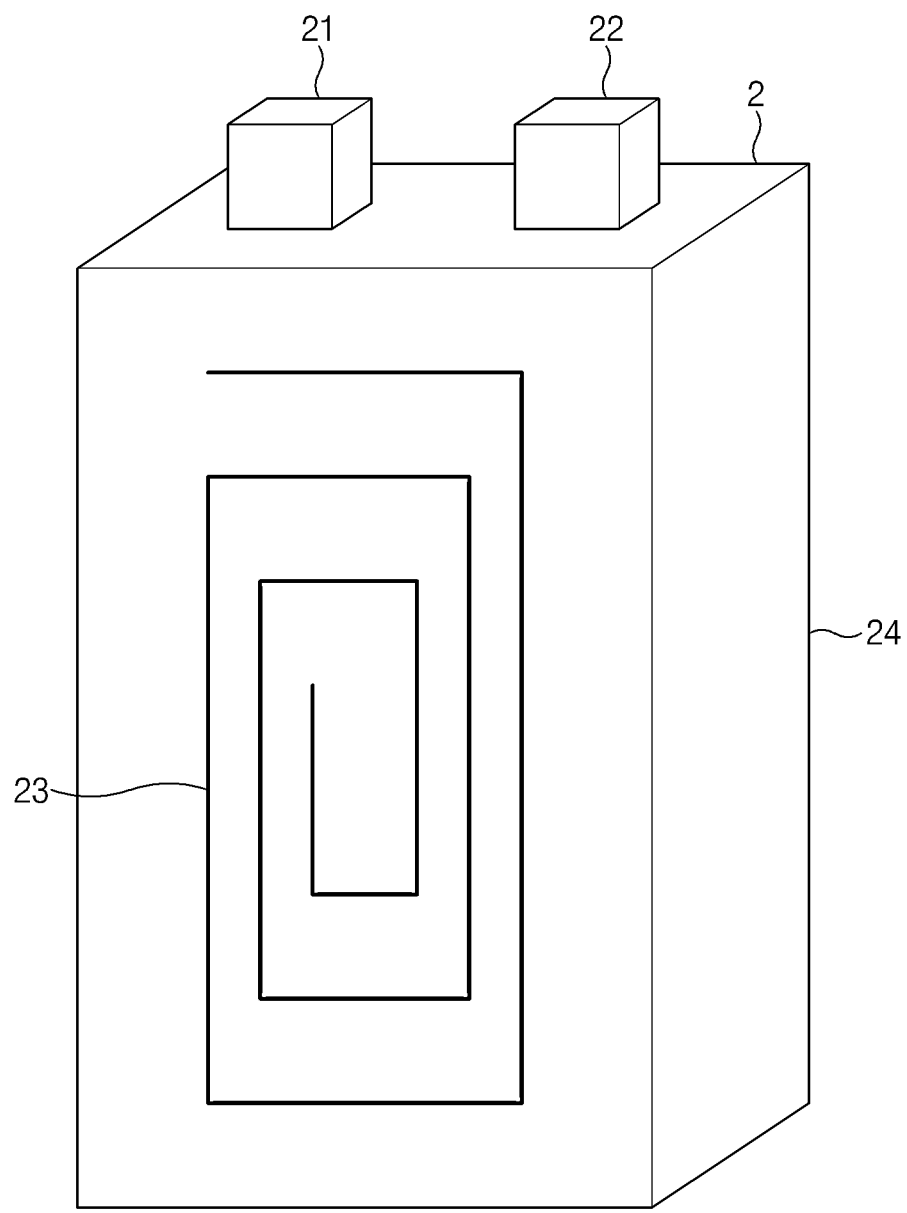
FIG. 2A is a perspective view showing the structure of the battery module 2 of FIG. 1.
Figure 2B:
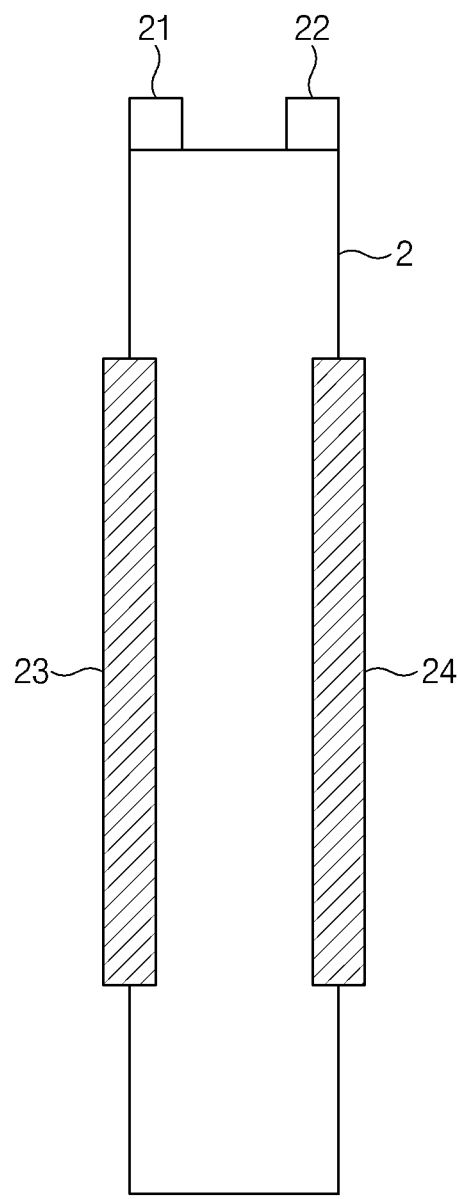
FIG. 2B is a side view showing the structure of the battery module 2 of FIG. 1.

FIGS. 2a and 2b are conceptual views showing the structure of the battery module 2 of FIG. 1. FIG. 2A is a perspective view showing the structure of the battery module 2, and FIG. 2B is a side view showing the structure of the battery module 2.

The battery module 2 may include a charge/discharge circuits 21 and 22, an antenna 23, an antenna 24, battery cells (not shown), and the MBMS 20 of FIG. 1.

The MBMS 20 may measure voltages of battery cells through the charge/discharge circuits 21 and 22. The MBMS 20 may measure voltages of each of the battery cells or measure the voltage of the battery module 2. The voltage of the battery module 2 may be the sum of voltages of the battery cells. As described with reference to FIG. 1, the MBMS 20 may calculate the SOC of the battery module 2 based on the measured voltage value.

For wireless charging with the battery modules 1 and 3 of FIG. 1, the battery module 2 may include antennas 23 and 24 on surfaces facing the battery modules 1 and 3, respectively. The battery module 2 may transmit power to the battery module 1 or receive power from the battery module 1 through the antenna 23 positioned on the surface facing the battery module 1. In addition, the battery module 2 may transmit power to the battery module 3 or receive power from the battery module 3 through the antenna 24 positioned on the surface facing the battery module 3.

Figure 3:
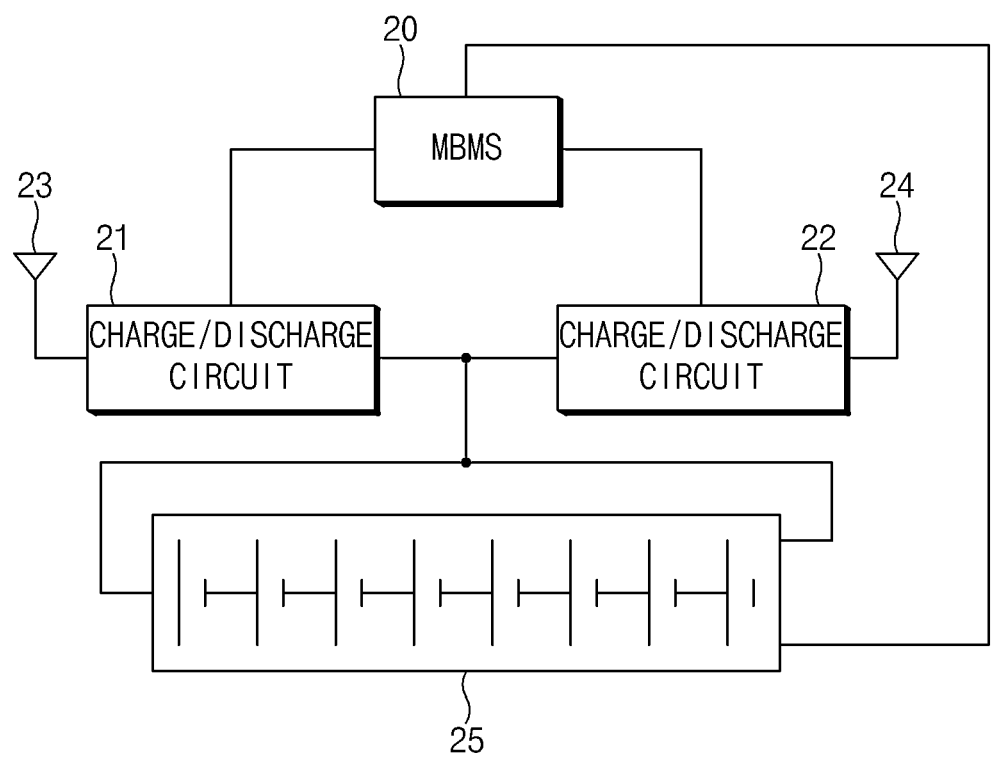
FIG. 3 is a block diagram showing the configuration of the battery module 2 of FIG. 1 according to an embodiment.

FIG. 3 is a block diagram showing the configuration of the battery module 2 of FIG. 1 according to an embodiment.

The battery module 2 may include MBMS 20, charge/discharge circuits 21 and 22, antennas 23 and 24, and battery cells 25.

The MBMS 20 may obtain information on the battery cells 25. The MBMS 20 may output information on the battery cells 25 to the RBMS 150 of FIG. 1. The RBMS 150 of FIG. 1 may control wireless charging between the battery modules 1 to n of FIG. 1 based on information received from the MBMS 20.

Under the control of the RBMS 150, the MBMS 20 may control the charge/discharge circuits 21 and 22 to transmit power to the battery module 1 and/or the battery module 3, or may control the charge/discharge circuits 21 and 22 to receive power from the battery module 1 and/or the battery module 3. Under the control of MBMS 20, the charge/discharge circuits 21 and 22 may output power to the battery modules 1 and 3 through the antennas 23 and 24, or may receive power from the battery modules 1 and 3.

The charge/discharge circuits 21 and 22 may charge the battery cells 25 using power received through the antennas 23 and 24. Also, the charge/discharge circuits 21 and 22 may output power obtained from the battery cells 25 through the antennas 23 and 24.

Figure 4:
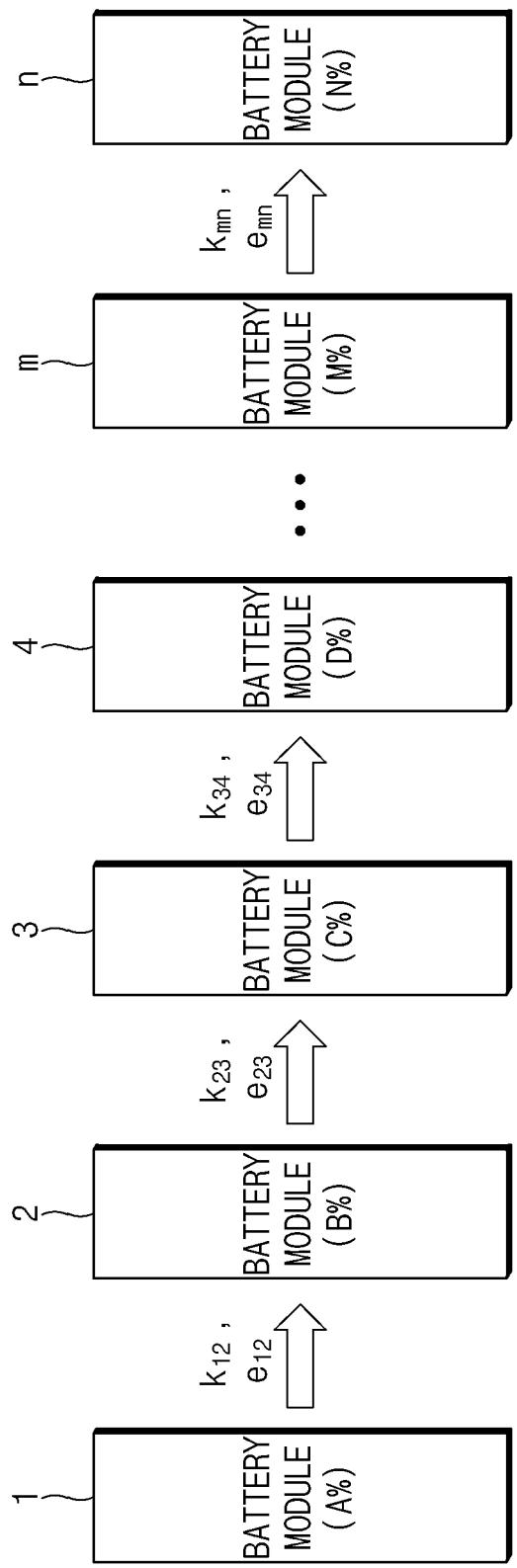
FIG. 4 is a conceptual diagram illustrating wireless charging between battery modules 1 to n of FIG. 1 according to an embodiment.

FIG. 4 is a conceptual diagram illustrating wireless charging between battery modules 1 to n of FIG. 1 according to an embodiment. Referring to FIG. 4, a method for the RMBS 150 of FIG. 1 to set the direction and size of wireless charging between the battery modules 1 to n will be described.

Any of the battery modules 1 to n may be wirelessly charged with one or more battery modules close to each other among the remaining battery modules. For example, the battery module 2 may be wirelessly charged with the battery modules 1 and 3 on either side of the battery modules 1 to n arranged in a line.

The RMBS 150 may receive information on SOC values of the battery modules 1 to n. In the description with reference to FIG. 4, the SOC values of the battery modules 1 to n are A (%), B (%), C (%), D (%) to N (%), respectively.

In the description with reference to FIG. 4, the wireless charging efficiency between the battery module a and the battery module b is expressed as '$k_{ab}$'. The wireless charging efficiency $k_{ab}$ between the battery module a and the battery module b may be the amount of power received by a reception battery module with respect to the power output from a transmission battery module among the battery modules a and b. Among the battery modules a and b, the transmission battery module is a battery module that transmits power during wireless charging, and the reception battery module is a battery module that receives power from the transmission battery module. For example, the wireless charging efficiency between the battery module 1 and the battery module 2 is expressed as '$k_{12}$'.

In the present specification, during wireless charging between the battery module a and the battery module b, the charging power moving between the battery module a and the battery module b is expressed as '$e_{ab}$'. The absolute value of charging power $e_{ab}$ indicates the amount of charging power that moves between the battery module a and the battery module b, and the sign of charging power $e_{ab}$ indicates the direction of charging power moving between the battery module a and the battery module b. When charging power $e_{ab}$ is a positive number, the battery module a may transmit power as much as an absolute value of the charging power $e_{ab}$ to the battery module b. When charging power $e_{ab}$ is a negative number, the battery module b may transmit power as much as an absolute value of the charging power $e_{ab}$ to the battery module a.

The RMBS 150 may calculate the charging powers $e_{12}$ to $e_{mn}$ based on [Equation 1] below.

[Equation 1]

$$[e_{12}\ e_{23}\ e_{34}\ \ldots\ e_{mn}] = E0 \times [(A-B)\ (B-C)\ (C-D)\ \ldots\ (M-N)] \begin{bmatrix} 1+k_{12} & -k_{12} & 0 & \ldots & 0 \\ -1 & 1+k_{23} & -k_{23} & \ldots & 0 \\ 0 & -1 & 1+k_{34} & \ldots & 0 \\ \vdots & \vdots & \vdots & \ddots & \vdots \\ 0 & 0 & 0 & \ldots & 1+k_{mn} \end{bmatrix}^{-1} \times \frac{1}{100}$$

In [Equation 1], 'E0' may represent converted power. The RMBS 150 may calculate the converted power E0 based on

[Equation 2] below. The converted power E0 may mean an amount of power required to charge the battery module.

$$E0[wh] = \text{capacity [Ah] of battery module} \times \text{driving voltage [V] of battery module} \quad \text{[Equation 2]}$$

The RMBS 150 may calculate the charging powers $e_{12}$ to $e_{mn}$ based on the information received from the battery modules 1 to n, [Equation 1], and [Equation 2]. The RMBS 150 may output information on the charging powers $e_{12}$ to $e_{mn}$ to battery modules related to the charging power among the battery modules 1 to n. For example, the RMBS 150 may output information on the charging powers $e_{12}$ to the battery modules 1 and 2. Each of the battery modules 1 to n may perform a wireless charging operation based on information received from the RMBS 150.

The wireless charging efficiency $k_{ab}$ between the battery modules a and b may be affected by the distance between the battery modules a and b, the types of antennas of the battery modules a and b, the number of turns of the coils constituting the antennas, and the like. Since the battery modules 1 to n included in one battery rack 100 have substantially the same structure, the wireless charging efficiencies $k_{12}$, $k_{23}$, $k_{34}$ to $k_{mn}$ between the battery modules 1 to n may be almost approximate values. Accordingly, the RMBS 150 may assume that the wireless charging efficiencies $k_{12}$, $k_{23}$, $k_{34}$ to $k_{mn}$ between the battery modules 1 to n have the same value k0 for convenience of calculation. In this case, the RMBS 150 may calculate the charging powers $e_{12}$ to $e_{mn}$ based on the following [Equation 3].

$e_{34}$ may be −270 [Wh], 1540 [Wh], and 1840 [Wh], respectively. According to the calculation result, the RMBS 150 may control the battery module 2 and the battery module 1 so that 270 [Wh] is output from the battery module 2 to the battery module 1. The RMBS 150 may control the battery module 2 and the battery module 3 so that 1540 [Wh] is output from the battery module 2 to the battery module 3. The RMBS 150 may control the battery module 3 and the battery module 4 so that 1840 [Wh] is output from the battery module 3 to the battery module 4.

Due to wireless charging between the battery modules 1 to 4 under the control of the RMBS 150, cell balancing between the battery modules 1 to 4 may be achieved.

Figure 5B:
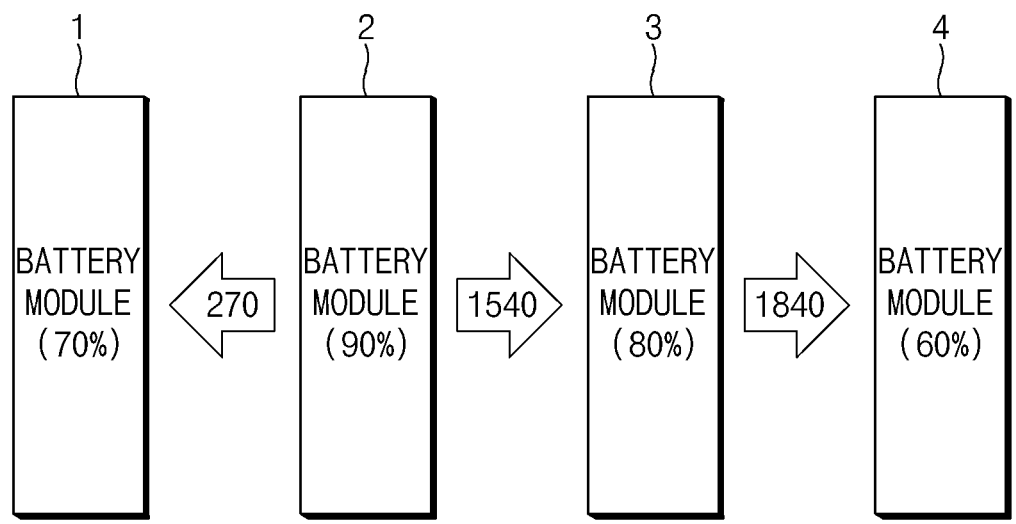
FIG. 5B is a diagram illustrating charging power moving between the battery modules 1 to 4 according to the charging powers $e_{12}$ to $e_{34}$ calculated in FIG. 5A.
Figure 6:
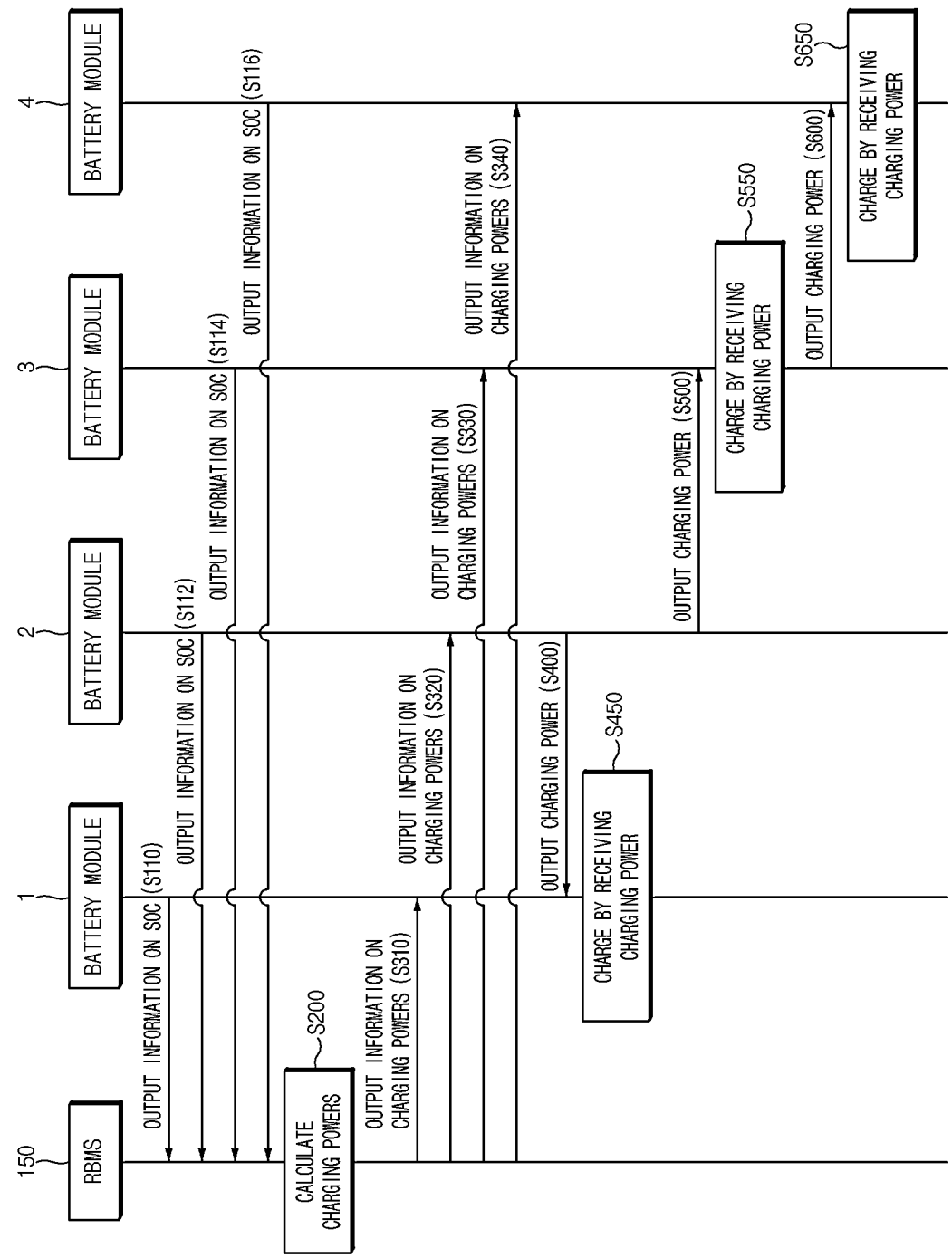
FIG. 6 is a flowchart illustrating a wireless charging operation between the battery modules 1 to 4 of FIG. 5B.

FIG. 6 is a flowchart illustrating a wireless charging operation between the battery modules 1 to 4 of FIG. 5B.

Referring to FIG. 6, a method for the battery modules 1 to 4 of FIG. 5B to perform a wireless charging operation under the control of the RMBS 150 will be described.

In operation S110, the battery module 1 may output information on the SOC value of the battery module 1 to the RMBS 150.

In operation S112, the battery module 2 may output information on the SOC value of the battery module 2 to the RMBS 150.

In operation S114, the battery module 3 may output information on the SOC value of the battery module 3 to the RMBS 150.

In operation S116, the battery module 4 may output information on the SOC value of the battery module 4 to the RMBS 150.

[Equation 3]

$$[e_{12}\ e_{23}\ e_{34}\ \ldots\ e_{mn}] = $$
$$E0 \times [(A-B)\ (B-C)\ (C-D)\ \ldots\ (M-N)] \begin{bmatrix} 1+k_0 & -k_0 & 0 & \ldots & 0 \\ -1 & 1+k_0 & -k_0 & \ldots & 0 \\ 0 & -1 & 1+k_0 & \ldots & 0 \\ \vdots & \vdots & \vdots & \ddots & \vdots \\ 0 & 0 & 0 & \ldots & 1+k_0 \end{bmatrix}^{-1} \times \frac{1}{100}$$

However, the present invention is not limited thereto, and the RMBS 150 considers both the convenience of calculation and the accuracy of the calculation to calculate the charging powers $e_{12}$ to $e_{mn}$ by assuming that only some of the wireless charging efficiencies among the wireless charging efficiencies $k_{12}$, $k_{23}$, $k_{34}$ to $k_{mn}$ are the same value.

FIG. 5A is a diagram illustrating charging powers $e_{12}$ to $e_{34}$ calculated by the RMBS 150 of FIG. 1, according to an embodiment. FIG. 5B is a diagram illustrating charging power moving between the battery modules 1 to 4 according to the charging powers $e_{12}$ to $e_{34}$ calculated in FIG. 5A.

In the description with reference to FIGS. 5A and 5B, the RMBS 150 assumes that the wireless charging efficiencies between the battery modules 1 to 4 have the same value of '0.7' for convenience of calculation. In addition, in the description referring to FIGS. 5A and 5B, it is assumed that the SOC values of the battery modules 1 to 4 are 70%, 90%, 80%, and 60%, respectively, and the converted power E0 is $10*10^4$[mWh].

In the description with reference to FIGS. 5A and 5B, for convenience of explanation, it is assumed that wireless charging is performed between the four battery modules 1 to 4, but the present invention is not limited thereto.

The RMBS 150 may calculate the charging powers $e_{12}$ to $e_{34}$ based on [Equation 2] described with reference to FIG. 4. As a result of the calculation, the charging powers $e_{12}$ to In operation S200, the RMBS 150 may calculate the charging powers $e_{12}$, $e_{23}$, and $e_{34}$ based on information (e.g., SOC values) received from the battery modules 1 to 4. However, the present invention is not limited thereto, and the battery modules 1 to 4 may output the voltage of each of the battery cells or the sum of the voltages of the battery cells. The RMBS 150 may calculate the SOC values of the battery modules 1 to 4 and calculate the charging powers $e_{12}$, $e_{23}$, and $e_{34}$ based on the information received from the battery modules 1 to 4.

In operation S310, the RMBS 150 may output information on the charging power $e_{12}$ to the battery module 1. The battery module 1 may prepare to receive power based on the information received from the RMBS 150.

In operation S320, the RMBS 150 may output information on the charging power $e_{12}$ and $e_{23}$ to the battery module 2. The battery module 2 may prepare to output power based on the information received from the RMBS 150.

In operation S330, the RMBS 150 may output information on the charging power $e_{23}$ and $e_{34}$ to the battery module 3. The battery module 3 may prepare to output power and prepare to receive power based on the information received from the RMBS 150.

In operation S340, the RMBS 150 may output information on the charging power $e_{34}$ to the battery module 4. The battery module 4 may prepare to receive power based on the information received from the RMBS 150.

In operation S400, the battery module 2 may output charging power $e_{12}$ to the battery module 1 based on the information received by operation S320.

In operation S450, the battery module 1 may receive charging power $e_{12}$ from the battery module 2 based on the information received by operation S320. The battery module 1 may charge the battery cells of the battery module 1 by using the charging power $e_{12}$ received from the battery module 2.

In operation S500, the battery module 2 may output charging power $e_{23}$ to the battery module 3 based on the information received by operation S320.

In operation S550, the battery module 3 may receive charging power $e_{23}$ from the battery module 2 based on the information received by operation S330. The battery module 3 may charge the battery cells of the battery module 3 by using the charging power $e_{23}$ received from the battery module 2.

In operation S600, the battery module 3 may output charging power $e_{34}$ to the battery module 4 based on the information received by operation S330.

In operation S650, the battery module 4 may receive charging power $e_{34}$ from the battery module 3 based on the information received by operation S340. The battery module 4 may charge the battery cells of the battery module 4 by using the charging power $e_{34}$ received from the battery module 3.

Figure 7:
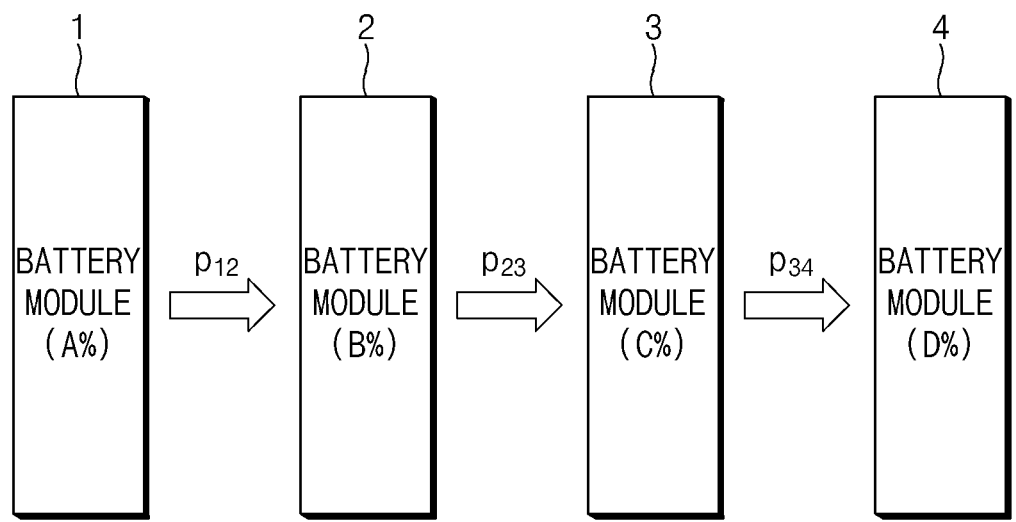
FIG. 7 is a conceptual diagram for explaining wireless charging between the battery modules 1 to 4 of FIG. 1 according to another embodiment.

FIG. 7 is a conceptual diagram for explaining wireless charging between the battery modules 1 to 4 of FIG. 1 according to another embodiment. For convenience of explanation, although only the wireless charging between the four battery modules 1 to 4 among the battery modules 1 to n of FIG. 1 is described, it is obvious that the wireless charging method may be extended to the battery modules 1 to n.

As described with reference to FIG. 4, any of the battery modules 1 to 4 may wirelessly charge one or more battery modules adjacent to each other. For example, the battery module 2 may be wirelessly charged with the battery modules 1 and 3 on either side of the battery modules 1 to 4 arranged in a line.

The SOC values of the battery modules 1 to 4 are A (%), B (%), C (%), and D (%), respectively. The RMBS 150 may receive information on SOC values of the battery modules 1 to 4.

Referring to FIG. 7, during wireless charging between the battery module a and the battery module b, charging power moving between the battery module a and the battery module b is expressed as '$p_{ab}$'. The absolute value of charging power $p_{ab}$ indicates the amount of charging power that moves between the battery module a and the battery module b, and the sign of charging power $p_{ab}$ indicates the direction of charging power moving between the battery module a and the battery module b. When charging power $p_{ab}$ is a positive number, the battery module a may transmit power as much as an absolute value of the charging power $p_{ab}$ to the battery module b. When charging power $p_{ab}$ is a negative number, the battery module b may transmit power as much as an absolute value of the charging power $p_{ab}$ to the battery module a.

The RMBS 150 may calculate the charging power $p_{ab}$ based on [Equation 4] below.

$$P_{ab} = (\text{SOC value of battery module } a - \text{SOC value of battery module } b) \times 1/(100) \times E0 \times h0 \quad \text{[Equation 4]}$$

The converted power E0 in [Equation 4] may be calculated by [Equation 2]. The conversion value h0 in [Equation 4] may be determined based on wireless charging efficiency between battery modules a and b, the distance between battery modules a and b, the SOC values of battery modules a and b, the types of antennas of battery modules a and b, the number of turns of the coils constituting the antennas, and the like. The conversion value h0 may be a value that changes based on SOC values of the battery modules a and b.

Figure 8:
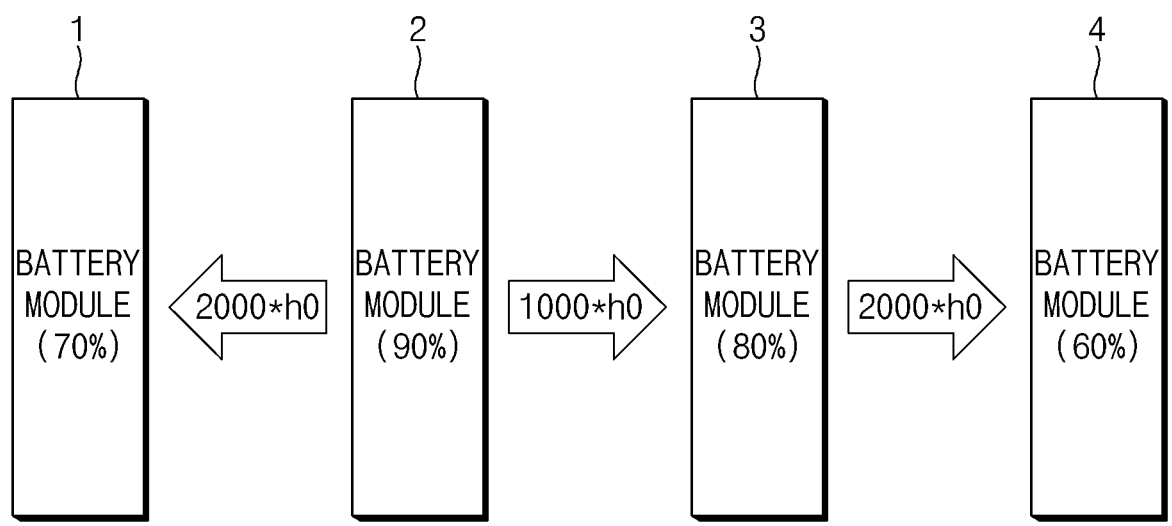
FIG. 8 is a diagram illustrating charging power moving between the battery modules 1 to 4 according to the method described with reference to FIG. 7.

FIG. 8 is a diagram illustrating charging power moving between the battery modules 1 to 4 according to the method described with reference to FIG. 7.

In the description referring to FIG. 7, it is assumed that the converted power E0 is $10^4$ [Wh] for the convenience of calculation in the RMBS 150. In the description with reference to FIG. 8, for convenience of explanation, it is assumed that wireless charging is performed between the four battery modules 1 to 4, but the present invention is not limited thereto.

The RMBS 150 may calculate the charging powers p12 to p34 based on [Equation 4] described with reference to FIG. 7. As a result of the calculation, the charging powers p12 to p34 may be $-2000*h0$ [Wh], $1000*h0$ [Wh], and $2000*h0$ [Wh], respectively. According to the calculation result, the RMBS 150 may control the battery module 2 and the battery module 1 so that $2000*h0$ [Wh] is output from the battery module 2 to the battery module 1. The RMBS 150 may control the battery module 2 and the battery module 3 so that $1000*h0$ [Wh] is output from the battery module 2 to the battery module 3. The RMBS 150 may control the battery module 3 and the battery module 4 so that $2000*h0$ [Wh] is output from the battery module 3 to the battery module 4.

Due to wireless charging between the battery modules 1 to 4 under the control of the RMBS 150, cell balancing between the battery modules 1 to 4 may be achieved.

Figure 9:
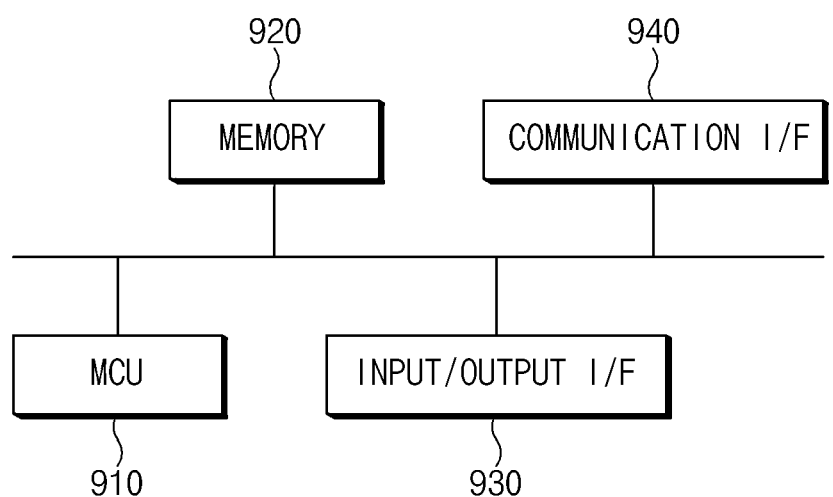
FIG. 9 is a diagram illustrating a hardware configuration of a BMS according to an embodiment of the present invention.

FIG. 9 is a diagram illustrating a hardware configuration of a BMS according to an embodiment of the present invention.

Referring to FIG. 9, a BMS 800 may include a microcontroller (MCU) 810 for controlling various processes and each configuration, a memory 820 on which an operating system program and various programs (e.g., a battery diagnosis program, a voltage approximation calculation program, etc.) are recorded, an input/output interface 830 for providing an input interface and an output interface between the battery cell module and/or the semiconductor switching element, and a communication interface 840 capable of communicating with the outside through a wired/wireless communication network. In this way, the computer program according to the present invention may be recorded in the memory 820 and processed by the microcontroller 810, and for example, may be implemented as a module that performs each functional block shown in FIG. 3.

The above are specific embodiments for carrying out the present invention. The present invention will include not only the above-described embodiments, but also simple design changes or easily changeable embodiments. In addition, the present invention will include techniques that may be easily modified and implemented using the embodiments. Therefore, the scope of the present invention should not be limited to the above-described embodiments, but should be defined by the claims described below as well as the claims and equivalents of the present invention.

The invention claimed is:

1. A battery management system, comprising:
a communication circuit configured to receive information on a first state of charge (SOC) of a first battery module, a second SOC of a second battery module, and a third SOC of a third battery module; and a controller configured to control a first wireless charging between the first battery module and the second battery module and a second wireless charging between the second battery module and the third battery module for balancing the first SOC, the second SOC and the third SOC, based at least on a first efficiency parameter and a second efficiency parameter, wherein the first wireless charging is to wirelessly transmit power from one of the first battery module and the second battery module to the other of the first battery module and the second battery module, wherein the second wireless charging is to wirelessly transmit power from one of the second battery module and the third battery module to the other of the second battery module and the third battery module, wherein the first efficiency parameter is determined based at least on a first wireless charging efficiency between the first battery module and the second battery module and a second wireless charging efficiency between the second battery module and the third battery module and based at least on a first relationship, and wherein the second efficiency parameter is determined based at least on the first wireless charging efficiency and the second wireless charging efficiency and based at least on a second relationship different from the first relationship.

2. The battery management system of claim 1, wherein the controller is further configured to control the first wireless charging and the second wireless charging such that a sum of an absolute value of a difference between the first SOC and the second SOC and an absolute value of a difference between the second SOC and the third SOC decreases.

3. The battery management system of claim 1, wherein the first SOC is a sum of SOCs of first battery cells in the first battery module, wherein the second SOC is a sum of SOCs of second battery cells in the second battery module, and wherein the third SOC is a sum of SOCs of third battery cells in the third battery module.

4. The battery management system of claim 1, wherein the second battery module is positioned between the first battery module and the third battery module.

5. The battery management system of claim 1, wherein the controller is further configured to control the first wireless charging and the second wireless charging based on the first SOC, the second SOC, the third SOC, the first wireless charging efficiency between the first battery module and the second battery module, and the second wireless charging efficiency between the second battery module and the third battery module, and wherein the first wireless charging efficiency is determined based on a distance between the first battery module and the second battery module, types of antennas for power transmission and reception of the first battery module and the second battery module, and the number of turns of coils constituting the antennas for power transmission.

6. The battery management system of claim 5, wherein the controller is further configured to:

determine a first direction and a first magnitude of the first wireless charging, and a second direction and a second magnitude of the second wireless charging, according to a matrix equation, control the first battery module or the second battery module such that, if the first direction is a negative number, power of the first magnitude is transmitted from the second battery module to the first battery module, and if the first direction is a positive number, the power of the first magnitude is transmitted from the first battery module to the second battery module, and control the second battery module or the third battery module such that, if the second direction is a negative number, power of the second magnitude is transmitted from the third battery module to the second battery module, and if the second direction is a positive number, the power of the second magnitude is transmitted from the second battery module to the third battery module, wherein the matrix equation is:

$$[e_{12} e_{23}] = E0 \times [(soc1 - soc2)(soc2 - soc3)] \begin{bmatrix} 1+k_{12} & -k_{12} \\ -1 & 1+k_{23} \end{bmatrix}^{-1} \times \frac{1}{100};$$

and wherein E0 is a constant, a sign and a magnitude of e12 are respectively the first direction and the first magnitude, a sign and a magnitude of e23 are respectively the second direction and the second magnitude, soc1 is the first SOC, soc2 is the second SOC, soc3 is the third SOC, k12 is the first wireless charging efficiency, and k23 is the second wireless charging efficiency.

7. The battery management system of claim 6, wherein E0 is determined by multiplying a capacity (Ah) of the first battery module by a driving voltage (V) of the first battery module.

8. The battery management system of claim 1, wherein:

each of the first and second relationships is based at least on the first wireless charging efficiency, the second wireless charging efficiency, the first SOC, the second SOC, and the third SOC.

9. A battery management system, comprising:

a communication circuit configured to receive information on a first state of charge (SOC) of a first battery module and a second SOC of a second battery module; and a controller configured to:

calculate first charging power based at least on a first wireless charging efficiency and a second wireless charging efficiency, wherein the first wireless charging efficiency is determined based on at least one of a distance between the first battery module and the second battery module, types of antennas for power transmission and reception of the first battery module and the second battery module, and the number of turns of coils constituting the antennas for power transmission; and control, according to at least the calculated first charging power, first wireless charging between the first battery module and the second battery module for balancing between the first SOC and the second SOC, wherein the first wireless charging is to wirelessly transmit power from one of the first battery module and the second battery module to the other of the first battery module and the second battery module.

10. A battery management system, comprising:

a communication circuit configured to receive information on a first state of charge (SOC) of a first battery module and a second SOC of a second battery module; and a controller configured to control first wireless charging between the first battery module and the second battery module for balancing between the first SOC and the second SOC, wherein the first wireless charging is to wirelessly transmit power from one of the first battery module and the second battery module to the other of the first battery module and the second battery module, wherein:

the controller is further configured to control the first wireless charging based at least on a first wireless charging efficiency between the first battery module and the second battery module; and the first wireless charging efficiency is different from a state of charge of a battery module.

\* \* \* \* \*